(12) United States Patent
Makwana (10) Patent No.: US 10,830,277 B2
(45) Date of Patent: Nov. 10, 2020

(54) SELF-ALIGNING CLUTCH RELEASE BEARING

(71) Applicant: TEXSPIN BEARINGS LIMITED, Ahmedabad (IN)

(72) Inventor: Vishal Makwana, Ahmedabad (IN)

(*) Notice: Subject to any disclaimer, the term of this patent is extended or adjusted under 35 U.S.C. 154(b) by 0 days.

(21) Appl. No.: 16/631,712

(22) PCT Filed: Jul. 18, 2018

(86) PCT No.: PCT/IB2018/055314
§ 371 (c)(1),
(2) Date: Jan. 16, 2020

(87) PCT Pub. No.: WO2019/021116
PCT Pub. Date: Jan. 31, 2019

(65) Prior Publication Data
US 2020/0182296 A1    Jun. 11, 2020

(30) Foreign Application Priority Data

Jul. 22, 2017  (IN) .............................. 201721026125

(51) Int. Cl.
*F16C 23/08* (2006.01)
*F16C 19/16* (2006.01)
*F16D 23/14* (2006.01)

(52) U.S. Cl.
CPC .......... *F16C 23/084* (2013.01); *F16C 19/163* (2013.01); *F16D 23/14* (2013.01); *F16C 2361/43* (2013.01)

(58) Field of Classification Search
CPC .. F16C 23/084; F16C 23/086; F16C 2361/43; F16D 23/14; F16D 23/143; F16D 23/144; F16D 23/145; F16D 23/146
See application file for complete search history.

(56) References Cited

U.S. PATENT DOCUMENTS 3,741,361 A * 6/1973 Brandenstein ...... F16C 33/7886
                                                      192/110 B
6,843,354 B2 * 1/2005 Dittmer ................. F16C 23/084
                                                        192/98

(Continued)

FOREIGN PATENT DOCUMENTS

FR     2916502 A1 * 11/2008   ............ F16C 23/084
FR     2927679 A1 *  8/2009   ............ F16C 33/586

(Continued)

*Primary Examiner* — Phillip A Johnson
(74) *Attorney, Agent, or Firm* — Rangarajan Sourirahan; Rajan Law Office, LLC (57) ABSTRACT

A self-aligning clutch release bearing having a rotating ring 114 and a static ring 112. Static ring 112 is located within a spherical cup 13, which incorporates an inner spherical surface 131, and the static ring 112 engages with the spherical cup 13 through the spherical surface 131. The spherical surface 131 has a radius whose center coincides with a center point 10 defined by intersection of the rotational axis 111 of the bearing and a plane defined by face of the rotating ring 114 that engages with fingers of the clutch. A spherical ring 14 incorporating a spherical end face 141 on its outer diameter is located within an inner diameter of the static ring 112, and engages with a spherical end face 113 on the inner diameter of the static ring. The two spherical end faces have about same radius with their centers coinciding with the center point 10.

8 Claims, 5 Drawing Sheets

(56) References Cited

U.S. PATENT DOCUMENTS 7,416,070 B2 * 8/2008 Winkelmann .......... F16D 23/14
                                                        192/98
8,534,926 B2 * 9/2013 Suzuki ................ F16C 33/7886
                                                        384/607

FOREIGN PATENT DOCUMENTS

WO   WO-2007137939 A1 * 12/2007   ........... F16D 23/146
WO   WO-2011088913 A1 *  7/2011   ........... F16D 23/143

* cited by examiner

SELF-ALIGNING CLUTCH RELEASE BEARING

CROSS REFERENCE TO RELATED APPLICATIONS

This U.S. non-provisional patent application is a national stage application, filed under 35 U.S.C. § 371, of International Application No. PCT/IB2018/055314 titled "SELF-ALIGNING CLUTCH RELEASE BEARING," filed on Jul. 18, 2018, the disclosure of which is hereby incorporated by reference in its entirety.

FIELD OF INVENTION

The inventive concepts relate to self-aligning clutch release bearing. More particularly, the inventive concepts relate to a self-aligning clutch release bearing having both self-aligning and self-centering features in a single mechanism.

BACKGROUND OF THE INVENTION

Majority of automotive vehicles are equipped with manual or automatic manual transmission system for providing control of speed and torque to the vehicle for different driving conditions. The control of speed and torque is achieved by altering the gear of transmission. This alteration of gear changes the speed and torque of the vehicle but the engine output remains unchanged. To compensate this change in speed and torque between the engine and the vehicle, a clutch is used to facilitate smooth alteration of gear in transmission systems.

Depending on the type of the vehicle, the clutch can be of following types: (1) friction clutch (2) centrifugal clutch (3) hydraulic clutch (4) dog clutch.

Centrifugal clutches are mostly used in mopeds or minibikes, hydraulic clutches are used in vehicles which are equipped with automatic transmissions, and dog clutches are clutches which have low life and wear problems.

Passenger vehicles and freight carriers typically use friction clutches. There are two types of friction clutches: i) Push type, and ii) Pull type. The main difference between these two types of clutches is the direction of clutch release force. Selection of push or pull type is based on clutch design and its packaging dimension.

Figure 1:
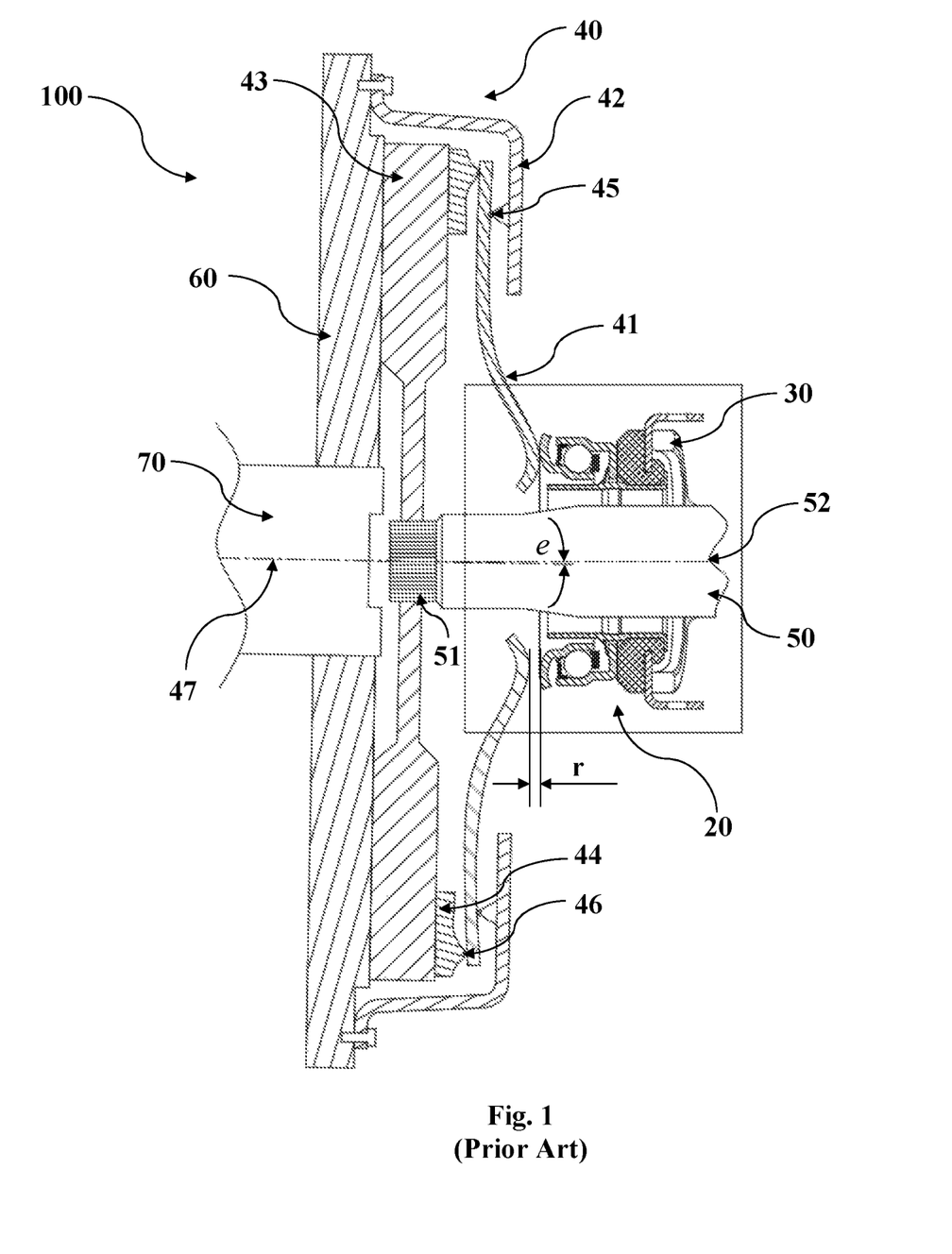
FIG. 1 shows a sectional view of a clutch assembly with conventional clutch release bearing.

An illustrative diagram of a typical push type of friction clutch assembly is shown in FIG. 1. As shown in FIG. 1, friction clutch assembly 100 comprises a flywheel 60, engine output shaft 70, clutch 40, clutch bearing 20, fork 30 and driven shaft 50. The flywheel 60 is rigidly connected to engine output shaft 70 to store the energy of engine in terms of inertia. The clutch 40 is concentrically mounted on the flywheel 60, to provide disengagement and engagement of output shaft 70 and driven shaft 50 for smooth gear shifting. The driven shaft 50 is placed concentric with clutch 40. The clutch bearing 20 is placed between clutch 40 and fork 30 and is concentrically and slide-ably mounted on driven shaft 50.

The clutch 40 comprises of preloaded diaphragm spring 41 or spring loaded levers (not shown), clutch cover 42, clutch plate 43 and pressure plate 44. The preloaded spring 41 is connected to clutch cover 42 through pivot point 45, holding the pressure plate 44 through point 46. The pressure plate 44 is frictionally in contact with clutch plate 43, which is further frictionally in contact with flywheel 60. The clutch plate 43 is connected to the driven shaft 50 by means of spline 51. The spline 51 allows relative axial movement of clutch plate 43 and driven shaft 50.

FIG. 1 shows engage condition of engine output shaft 70 and driven shaft 50 wherein the preloaded diaphragm spring 41 applies force on clutch plate 43 by pushing the pressure plate 44 against it. During gear shifting, it is required to disengage the driven shaft 50 from the output shaft 70 which is done by releasing pressure from the clutch plate 43. To release the pressure from the clutch plate 43, axial force must be applied on the diaphragm spring 41. The axial force required for releasing the clutch plate 43 is known as clutch release force. Applying force on the diaphragm spring deflects it from pivot point 45 as shown in FIG. 1 and pulls the pressure plate 44 through point 46 to release the clutch plate 43, thereby disengaging the driven shaft 50 from the engine output shaft 70.

The disengaging process of the driven shaft 50 from the engine output shaft 70 is achieved by clutch bearing 20 and fork 30 or hydraulically operated actuation mechanism (not shown). The fork 30 is actuated by slave cylinder (not shown) or mechanical linkages which is further operated by pedal effort to apply clutch release force on clutch bearing 20 which transfer the axial force to the clutch finger 41 in order to disengage the clutch plate 43 from flywheel 60, thereby disengaging the driven shaft 50 from the engine output shaft 70 and providing smooth gear shifting.

Figure 2:
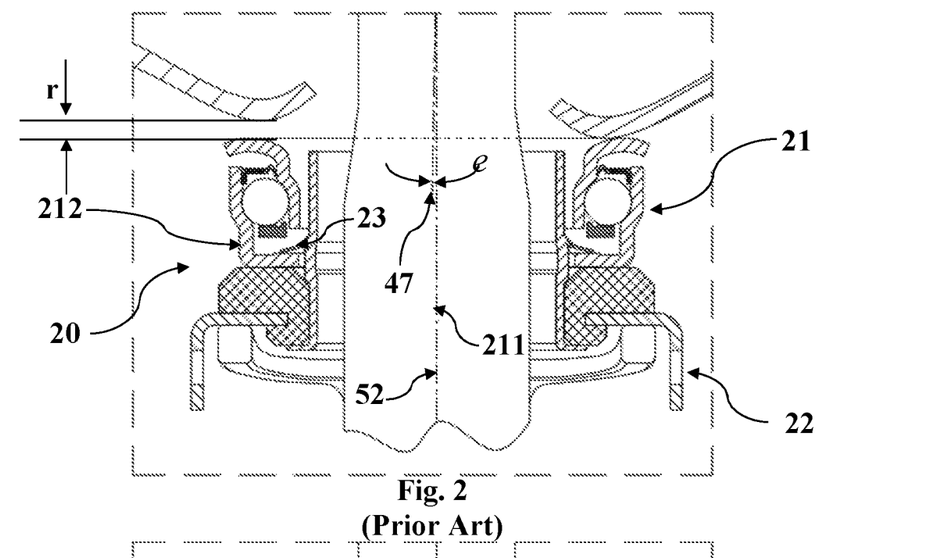
FIG. 2 shows an enlarged sectional view of conventional clutch release bearing with inaccuracies of run-out and misalignment.

The clutch 40 has geometrical inaccuracies as a result of manufacturing tolerances of its components. Because of manufacturing tolerances there is eccentricity between clutch rotation axis 47 and driven shaft axis 52. To compensate for this eccentricity, self-centering feature is provided in conventional clutch bearing 20. To provide this self-centering feature, static ring 212 of bearing is preloaded by spring 23 and there is a gap c between static ring 212 and sleeve 22 of clutch bearing 20, as shown in FIG. 2. Because of this gap c bearing 21 has a tendency to shift under application of radial forces and get in centered with clutch axis 47.

Furthermore, there are two more geometrical inaccuracies in clutch assembly 100,
  i. One of the geometrical inaccuracies is run-out r of clutch finger 41, shown in FIG. 1 and FIG. 2. This inaccuracy is due to inaccurate fitment of diaphragm spring 41 with clutch cover 42 and cumulative tolerances of all components which are connected to it.
  ii. Because of mounting inaccuracy of clutch 40 and flywheel 60 there is misalignment θ between clutch rotation axis 47 and driven shaft axis 52 as shown in FIG. 1 and FIG. 2.

As mentioned above, the clutch bearing 20 has three geometrical inaccuracies—(1) eccentricity of rotational axis of clutch and driven shaft 47, 57 (2) run-out r of spring 41, and (3) misalignment θ of rotational axis of clutch and driven shaft—from which the inaccuracy of eccentricity is compensated in conventional clutch bearing 20 by self-centering feature. Because of remaining two inaccuracies, clutch bearing 20 suffers from unbalanced forces of diaphragm spring 41. The unbalanced forces create vibrations in clutch bearing, which is transferred to the clutch pedal by fork and its actuation mechanism. The vibration reduces driver comfort while clutching. Furthermore, said unbalanced forces creates noise, wearing of rotating ring and wearing of rolling elements, which result in excessive temperature rise and premature failure of clutch bearing 20.

Prior art describing clutch release bearing include DE 102009055659A1 and DE 102007053180A1.

Therefore, the need exists for a self-aligning clutch release bearing compensate the inaccuracy of run-out of diaphragm spring and misalignment of driven shaft in clutch assembly. There is a further need for a self-aligning clutch release bearing having both self-centering and self-aligning features in a single mechanism.

SUMMARY OF THE INVENTION

The inventive concepts overcome the disadvantages of the prior art and fulfills the needs noted above by providing a self-aligning clutch release bearing. Embodiments of the inventive concepts may provide a self-aligning clutch release bearing to compensate for inaccuracy in run-out of diaphragm spring and misalignment of driven shaft in clutch assembly; a self-aligning clutch release bearing having both self-centering and self-aligning features in a single mechanism; a self-aligning clutch release bearing which reduces clutch pedal effort by reducing harsh sliding of clutch bearing on driven shaft by reducing the tilt of the sleeve; a self-aligning clutch release bearing that absorbs the vibrations caused by unbalanced forces of diaphragm spring and increases comfort of driver while clutching; a self-aligning clutch release bearing without loose parts or major modifications to bearing rings thereby reducing wear, extra material or bearing vibration; and a self-aligning clutch release bearing with self-aligning and self-centering features without any major modification in bearing ring thereby eliminating wear and premature failure of bearing.

Embodiments of the present disclosure relate to a self-aligning clutch bearing for clutch release bearing application in a clutch, which adjusts its position to compensate the inaccuracy of run-out of clutch fingers or diaphragm spring, as well as misalignment of driven shaft in clutch assembly.

In an embodiment, the disclosed self-aligning clutch bearing comprises a rotating ring, a static ring and a spherical cup.

In an embodiment, the static ring is in engagement with the rotating ring through a plurality of balls positioned between the rotating ring and the static ring, for a frictionless rotation of the rotating ring relative to the static ring about a rotational axis of the bearing.

In an embodiment, the spherical cup is sized to accommodate the static ring within an inner cavity of the spherical cup.

In an embodiment, the spherical cup contains an inner spherical surface such that the static ring engages with the spherical cup through the spherical surface of the spherical cup.

In an embodiment, the spherical surface of the spherical cup has a radius whose center coincides with a center point, which is defined by the intersection of the rotational axis of the bearing and a plane defined by the face of the rotating ring that engages with fingers of the clutch.

In an embodiment, engagement of the static ring with the spherical cup enables the static ring, along with the rotating ring and a plurality of balls positioned between the rotating ring and the static ring, to tilt about the center point to accommodate any angular misalignment between the fingers of the clutch and the rotating ring.

In an embodiment, the static ring, in the region that is in engagement with the spherical surface of the spherical cup, incorporates a radius that is equal or less than the radius of the spherical surface of the spherical cup.

In an embodiment, the self-aligning bearing further comprises a spherical ring located within an inner diameter of the static ring. The spherical ring incorporates a spherical end face on its outer diameter, and the static ring incorporates a spherical end face on its inner diameter. The two spherical end faces on the static ring and the spherical ring have about same radius with their centers coinciding with the center point.

In an embodiment, the spherical ring is preloaded against the spherical end face of the static ring by a spring.

In an embodiment, the spring is positioned between a stopper on a sleeve on which the bearing is mounted, and the spherical ring.

In an embodiment, the two spherical end faces on the static ring and the spherical ring are configured such that engagement of the spherical ring with the static ring through the respective spherical end faces, coupled with the preloading of the spherical ring by the spring retains the bearing with the sleeve against axial displacement.

In an embodiment, the inner diameters of the spherical ring and the spherical cup are larger than an outer diameter of the sleeve resulting in a clearance for the spherical ring and the spherical cup to shift radially inward, thereby allowing the bearing to self-center with reference to the clutch.

In an embodiment, the spherical ring is heat treated.

Other features and advantages of the inventive concepts will become apparent from the following description of the invention, which refers to the accompanying drawings.

Reference numerals used for various parts of the invention:

1: Present self-aligning clutch release bearing
1A: Second embodiment of self-aligning clutch release bearing
1B: Third embodiment self-aligning clutch release bearing
100: Clutch assembly
10: Center point of bearing
11: Bearing
11A: Bearing for second embodiment
11B: Bearing for third embodiment
111: Rotation axis of Bearing
112: Static ring of Bearing
113: Spherical face of Static ring
114: Rotating ring of bearing
115: Rolling element of bearing
116: Inner spherical face of static ring
12: Sleeve
12A: Sleeve of second embodiment 12B: Sleeve of third embodiment
121: Bush of sleeve
122: Bracket support
123: Bracket
124: Spring stopper
13: Spherical cup
131: Spherical face of cup
14: Spherical ring
141: Spherical face of ring
15: Spring
16: Cover
161: Outer spherical face of cover
161: Inner spherical face of cover
17: Cover for third embodiment
171: Spherical face of cover
20: Conventional clutch bearing
21: Conventional bearing
211: Rotation axis of Conventional bearing
212: Static ring of conventional bearing
22: Conventional sleeve
23: Spring of conventional clutch bearing
30: Fork
40: Clutch
41: Diaphragm spring
42: Clutch cover
43: Clutch plate
44: Pressure plate
45: Pivot point on cover
46: Pivot point on pressure plate
47: Rotation axis of clutch
50: Driven shaft
51: Spline of driven shaft
52: Rotation axis of driven shaft
60: Flywheel
70: Engine output shaft

DETAILED DESCRIPTION OF THE PREFERRED EMBODIMENTS

Disclosed embodiments relate to self-aligning clutch release bearing.

The terminology used herein is for the purpose of describing particular embodiments only and is not intended to limit the invention. As used herein, the singular terms "a," "an," and "the" are intended to include the plural forms as well, unless the context clearly indicates otherwise. It will be further understood that the terms "comprises", "comprising", "having," "containing," "includes" and/or "including", when used herein, are to be construed as open-ended terms and specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meaning as commonly understood by one of ordinary skill in the art.

The inventive concept provides a self-aligning clutch release bearing 1, the self-aligning clutch release bearing further providing both self-centering and self-aligning features in a single mechanism.

Figure 3:
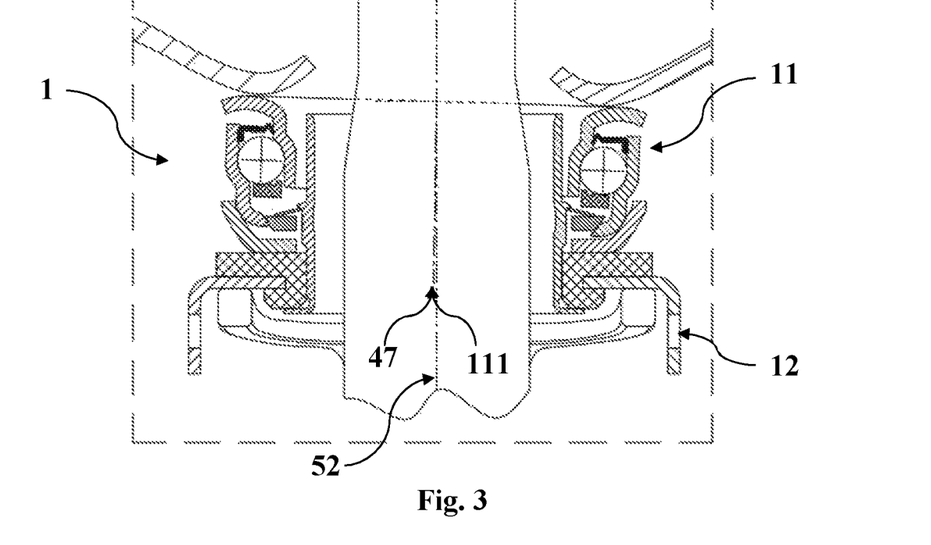
FIG. 3 illustrates a sectional view of a self-aligning clutch release bearing in accordance with an embodiment of the inventive concepts.
Figure 4:
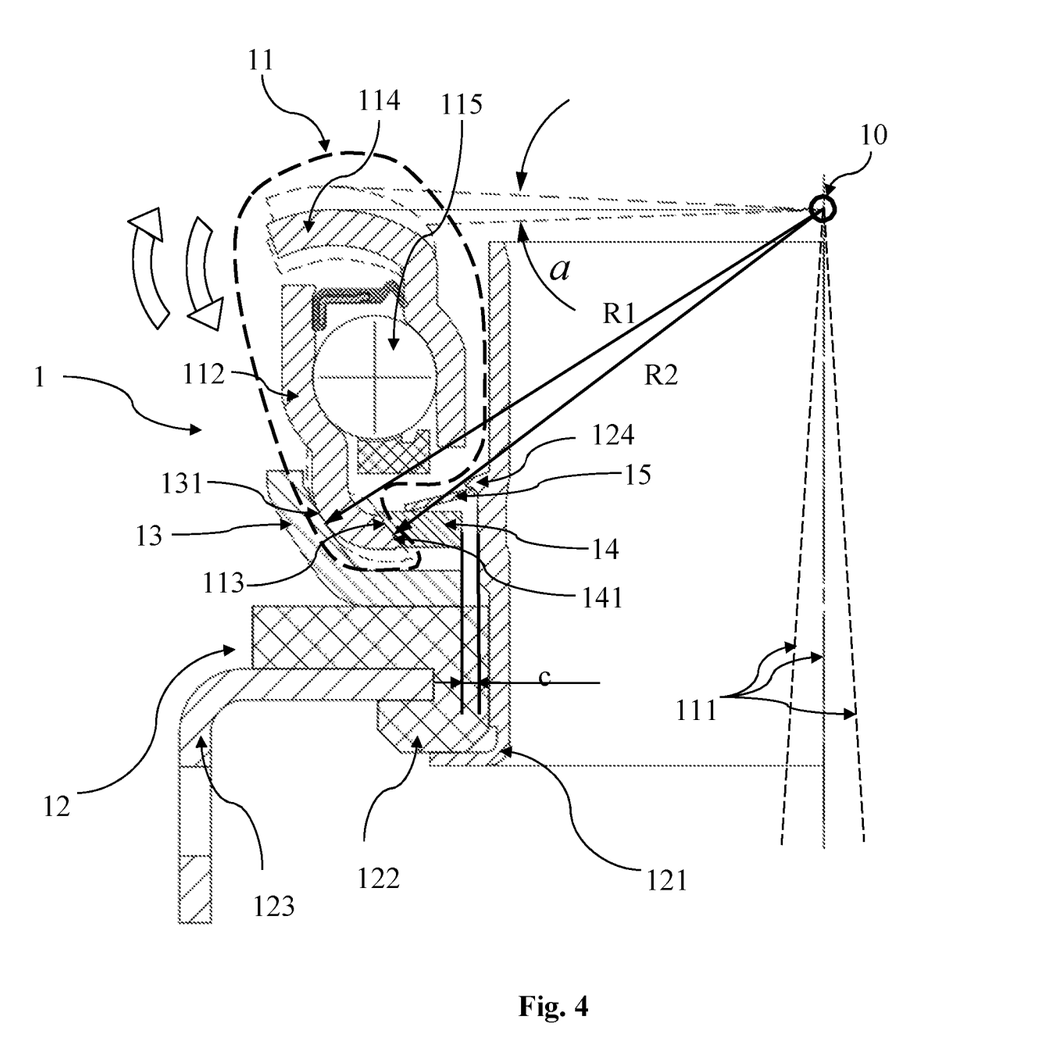
FIG. 4 illustrates an enlarged sectional view of the self-aligning clutch release bearing showing its self-aligning feature in accordance with an embodiment of the inventive concepts.
Figure 5:
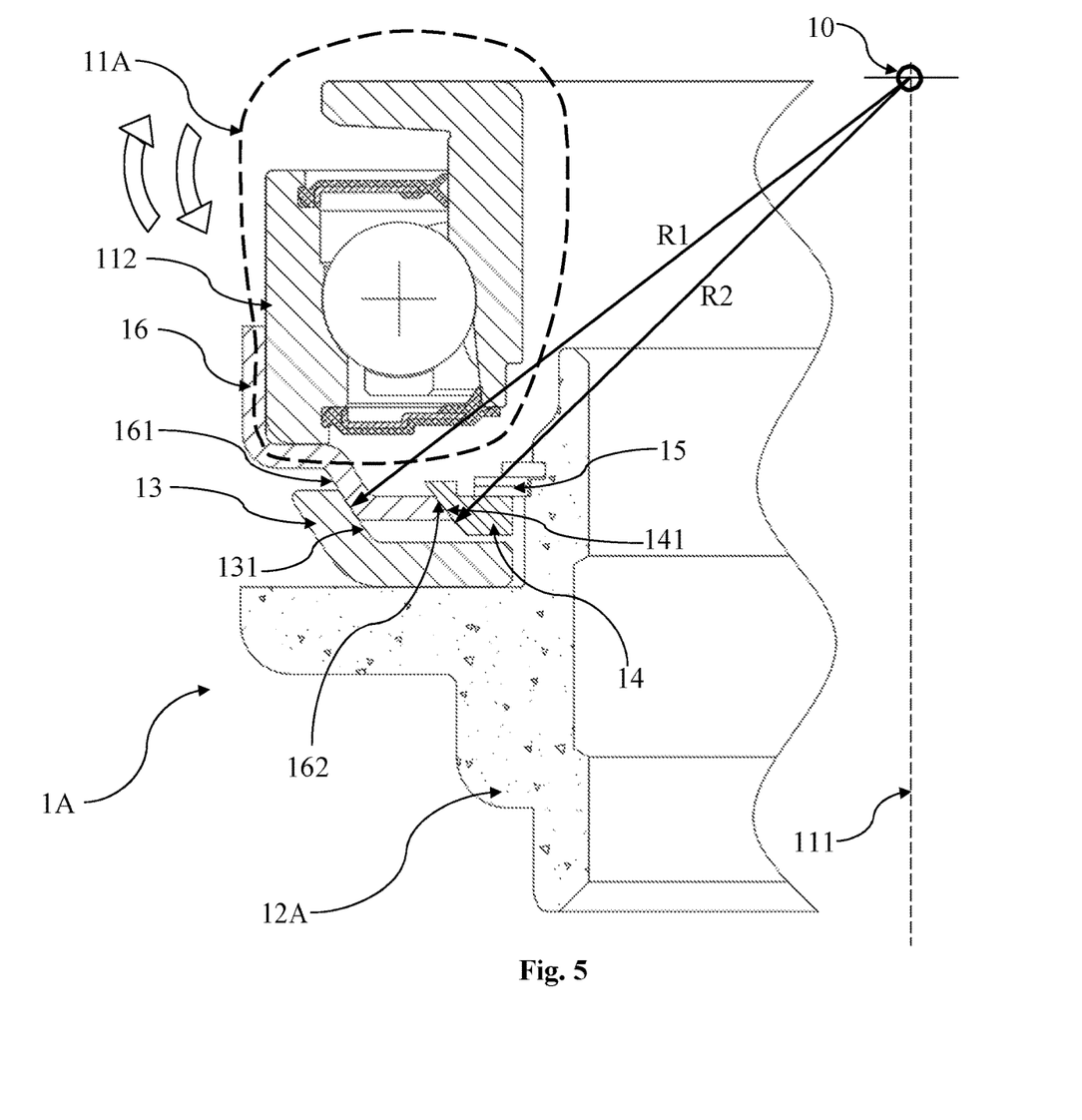
FIG. 5 illustrates a sectional view of a self-aligning clutch release bearing in accordance with an embodiment of the inventive concepts.

Referring to FIGS. 3, 4 and 5; which illustrate embodiments of the inventive concepts, the self-aligning clutch release bearing 1 mainly comprises:

Bearing 11
Sleeve 12
Spherical cup 13
Spherical ring 14
Spring 15

The bearing 11 comprises a rotating ring 114 and a static ring 112, between the tracks of which a plurality of balls 115 are accommodated and allowed to roll between them 114 and 112. Rotating ring 114 and static ring 112 are preferably made from bearing steel and are hardened.

The sleeve 12 is placed between actuating fork 30 or piston of hydraulic actuation mechanism (not shown) and bearing 11 to provide seating face for fork 30 or piston of hydraulic actuation mechanism.

The static ring 112 incorporates a spherical end face 113 (also referred to simply as face and the two terms used interchangeably hereinafter) at its inner diameter. The spherical ring 14 is heat treated. Further, the spherical ring 14 incorporates a spherical end face 141 (also referred to simply as face and the two terms used interchangeably hereinafter) on its outer diameter, the spherical face 141 matches with spherical end face 113 of the static ring 112. Both the spherical faces 113 and 141 have same spherical radius R2 to allow the tilting of bearing 11 on action of unbalanced forces due to misalignment. The center point 10 of the spherical radii is defined by intersection of the rotational axis 111 of the bearing 11 and a plane defined by the face of the rotating ring that engages with fingers of the clutch as shown in FIG. 4. The spring 15 is placed between stopper 124 of sleeve 12 and spherical ring 14 and is in preloaded condition, thereby applying force on spherical ring 14. As shown in FIGS. 4 and 5, there is a gap c between spherical ring 13 and bush 121 to provide means of self-centering while working.

The bearing 11 is placed in spherical cup 13, which is placed on said sleeve 12. The spherical cup 13 incorporates an inner spherical surface 131 with radius of R1. The spherical cup 13 is heat treated. This spherical surface 131 also has the same center point 10 as spherical face 141 of spherical ring 14.

As shown in FIG. 4, the static ring 112, in the region that is in engagement with the spherical surface 131 on the spherical cup 13, incorporates a radius that is less than the radius of the spherical surface 131 on the spherical cup 13. This ensures smooth engagement between the static ring 112 and the spherical cup 13 by minimizing contact surface between the two.

Three components: (i) spherical ring 14, (ii) static ring 112 and (iii) spherical cup 13, are preloaded by means of spring 15 against the sleeve 12, which retains the bearing 1 along with the spherical cup 13 with the sleeve 12, yet providing self-centering functionality by allowing the bearing 11 to shift, as shown in FIG. 5.

Further, these three components have spherical faces 113, 131 and 141 with same center point 10, which allows bearing 11 to tilt about center point 10 by an angle of a. As shown in FIG. 3, this mechanism compensates the run-out r of diaphragm spring 41 and misalignment θ of shaft 50 and matches the rotation axis (47 and 111) of clutch 40 and clutch bearing 1, on action of unbalanced forces, yet equally distribute the forces on bearing 11, thereby reduces the wear of ring, vibrations, noise and premature failure of clutch release bearing 1.

As shown in FIG. 3, the bearing 11 gets tilted by an angle β, which is cumulative of run-out r and misalignment θ on application of unbalanced forces. This tilting matches the clutch rotation axis 47 and bearing rotation axis 111, which aligns the bearing 11 with diaphragm spring 41 and equally distributes the release force on bearing 11.

As shown in FIG. 4, the bearing 11 is allowed to tilt by an angle α as a result of self-aligning feature constituted by preloaded spring 15, bearing 11 and spherical cup 13. The bearing 11 is tilted by unbalanced forces from diaphragm spring as a result of geometrical inaccuracies of run-out r and misalignment θ. Tilting of bearing 11 equally distributes release force on bearing ring which helps to reduce wear and rise in temperature.

Further, the bearing 11 is allowed to shift radially on sleeve 12 to an extent of gap c shown in FIG. 4. This shifting requires some amount of radial force on bearing ring 114 as bearing 11 is preloaded under spring 15. The amount of required radial force on bearing ring 114 to shift the bearing 11 is called shifting force. The shifting force comes from diaphragm spring 41 as a result of geometrical inaccuracy of eccentricity.

Another embodiment of the inventive concept, as shown in FIG. 5, comprises a cover 16. A conventional bearing 11A is press fitted in cover 16. The cover 16 comprises of an outer spherical face 161 and a n inner spherical face 162. The spherical face 161 has a radius of R1 which is about same as radius of spherical cup 13. Further the spherical face 162 has radius of R2 which is about same as radius of spherical ring 14. The cover 16 is preloaded between the spherical cup 13 and the spherical ring 14 by spring 15. The center points of the spherical faces are at the same position on point 10. In this embodiment, the cover 16 and the bearing 11A can tilt about point 10 and compensate for the run-out r and misalignment θ. Hence, the inventive concept allows one to convert conventional clutch bearing into a self-aligning clutch bearing 1.

Figure 6:
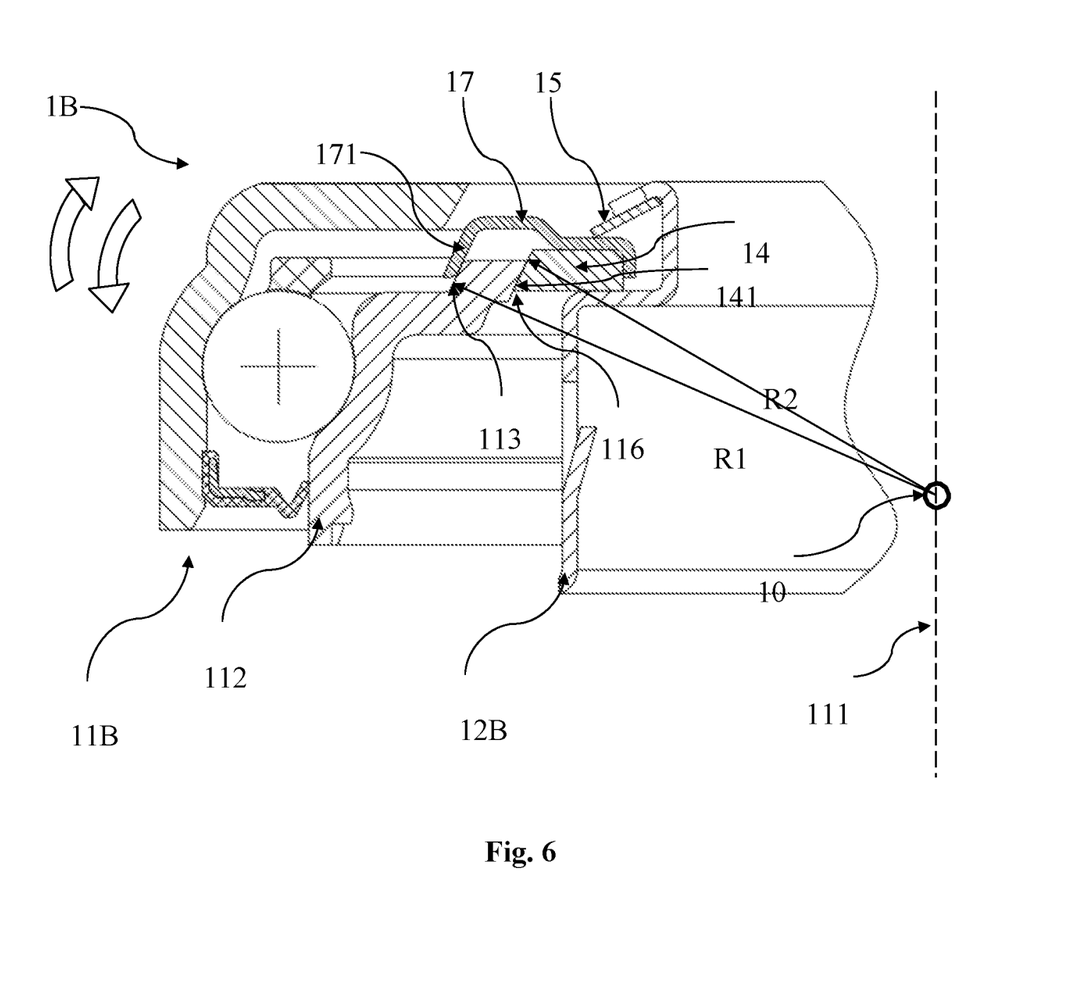
FIG. 6 discloses a sectional view of a self-aligning clutch release bearing in accordance with an embodiment of the inventive concepts.

Another embodiment of the inventive concept, as shown in FIG. 6, bearing 11B comprises a static ring 112 with a spherical face 113. The cover 17 for this embodiment is as shown in FIG. 5 comprises a spherical face 171. The cover 17 is preloaded between spring 15 and spherical ring 14. The center points of the spherical faces 171, 113, 116 and 141 are at the same position on point 10. In this embodiment, the bearing 11B can tilt about point 10 and compensate inaccuracies of run-out r and misalignment θ. Hence, the inventive concept allows one to convert conventional clutch bearing to a self-aligning clutch bearing.

Another embodiment of the inventive concepts includes a method of using the self-aligning clutch bearing. With the starting of an automotive vehicle, the output shaft 70 of engine starts to rotate, which further rotates the flywheel 60 as it is rigidly connected with output shaft 70. The clutch 40 also rotates at same speed of flywheel as they are connected rigidly and concentrically by clutch cover 42. The driven shaft 50 is connected with clutch plate 43 by means of spline 51, which implies that driven shaft also rotates. Further, the rotating ring 114 of clutch bearing 1 is in contact with the diaphragm spring 41 of clutch 40 with some preload. Here the rotating ring 114 rotates, while static ring 112 remains stationary as there are balls 115 rolling between them. The static ring 112 makes the sleeve 12 of clutch bearing 1 to remain stationary as sleeve 12 is connected with static ring 112 by means of preloaded spring 15. The fork 30 is placed on sleeve 12 and is connected with slave cylinder (not shown). So, here fork 30, sleeve 12 and static ring 112 are stationary.

At the time of starting the vehicle, the gears are in neutral condition so that the gears are not connected to the output shaft and the vehicle speed is zero. To achieve some speed the gears of the vehicle must be changed from neutral so the driven shaft 50 is connected to the gears.

The assembly of friction clutch 100 has inaccuracies of eccentricity, run-out r and misalignment θ. Because of these inaccuracies the rotating ring 114 of clutch bearing 1 suffers from unbalanced forces from diaphragm spring 41.

Applying release force on clutch bearing 1 by fork 30, which is operated by slave cylinder or mechanical linkages (not shown), the diaphragm spring 41 deflects and releases clutch plate 43 from flywheel 60.

At the start of the vehicle, clutch 40 and clutch bearing 1 are rotating at speed of engine. When there is inaccuracy of eccentricity, the clutch 40 applies radial load on rotating ring 114. Through the rotating ring 114, force transmits to the static ring 112 via balls 15. As static ring 112 get the required shifting force, it slides frictionally on sleeve 12 as it is preloaded by spring 115. As the bearing 11 slides on sleeve 12, the rotation axis of bearing and clutch becomes the same.

To run the vehicle at some speed, driver applies some effort on clutch pedal which is converted to clutch release force by slave cylinder (not shown). The slave cylinder actuates fork 30 which applies force on clutch release bearing 1. As amount of force increases on clutch bearing 1, the bearing 11 experiences more unbalanced forces as a result of geometrical inaccuracies of run-out r and misalignment θ. The unbalanced forces tilt the bearing 11 about center point 10 as contact faces 131, 113 and 141 have spherical faces.

After tilting, the release force equally distributes on bearing ring which reduces noise, vibration, and wear. Further as there is no wear on bearing ring the temperature rise is less.

| Feature | Inventive Concepts | Conventional/Prior Art |
| --- | --- | --- |
| Self-aligning | Inventive concepts have self-aligning feature, which equally distributes the unbalanced forces of diaphragm spring. | Conventional clutch bearing does not have self-aligning feature, because of which bearing suffers from unbalanced forces |
| Life | Because of equal distribution of forces clutch bearing has 25-30% more life than conventional | As conventional bearing suffers from unbalanced forces, its life is short |
| Clutching Comfort | Because of self-aligning feature, clutch bearing absorbs the vibration caused by unbalanced forces and increases clutching comfort | Conventional clutch bearing does not absorb vibration caused by unbalanced forces, which reduces clutching comfort |
| Wear and Temperature | Because of equal distribution of forces, wear of bearing | As conventional bearing suffers from unbalanced forces, wear of |

-continued

| Feature | Inventive Concepts | Conventional/Prior Art |
|---|---|---|
| | ring reduces as a result of which rise in temperature is less by 10-15%. | bearing ring is more as result of which rise in temperature is higher. |
| Packaging Size | self-aligning clutch bearing has same packaging size d as of the conventional. | Packaging size d is more in case of prior art, as there are extra material required for self-aligning feature. |
| Complexity | Very slight and reliable modification required to convert conventional clutch bearing | Extra material, extra machining or loose parts required to provide self-aligning feature as described in prior art, which increases complexity of manufacturing. |

From the table and descriptions, it is seen that by providing spherical faces to the static ring 121, spherical cup 13 and spherical ring 14, said bearing 11 is allowed to tilt by the center point 10. The tilting equally distributes unbalanced forces of diaphragm spring 41, which increases life of bearing 11 and reduces wear of bearing rings. Further, as there is no wear of bearing rings, the rise in temperature is less than conventional bearing 20. Furthermore, because of self-aligning feature present bearing 1 absorbs vibration of diaphragm spring 41, which improves the clutching comfort of driver. Further, the inventive concepts do not include any extra material or complex machining, instead require very slight modification in conventional bearing 20. Furthermore, the inventive concepts have same packaging size d as of the conventional bearing 20, unlike the prior art having larger packaging size of bearing. Thus, the inventive concepts provide self-aligning and self-centering feature to the clutch bearing, which is very reliable and increases the life of the bearing and clutching comfort of drivers.

The inventive concepts impart various advantages over the prior art. These advantages are: (i) self-aligning clutch release bearing having both features of self-centering and self-aligning are provided in a single mechanism; (ii) compensation of inaccuracies of run-out r and misalignment θ, which implies that bearing does not suffer from unbalanced forces and hence, no risk of premature failure; (iii) reduction in harsh sliding of clutch bearing on driven shaft 50, thereby reducing pedal effort; (iv) absorption of unbalanced forces from diaphragm spring which increases the clutching comfort of driver; (v) increase in bearing life by 25-30% and reduction in temperature rise by 10-15%; (vi) self-aligning clutch release bearing without any loose parts; and (vii) reduction in noise and vibration in bearing.

While the inventive concepts described herein with reference to illustrative embodiments for particular applications, it should be understood that the inventive concepts are not limited thereto. The foregoing description of the illustrative embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein. Those having ordinary skill in the art and access to the teachings provided herein will recognize additional modifications, applications, embodiments and substitution of equivalents all fall within the scope of the inventive concepts. Accordingly, the inventive concepts are not to be considered as limited by the foregoing description.

The invention claimed is:

1. A self-aligning bearing for clutch release bearing application in a clutch, said self-aligning bearing comprising:
a rotating ring having a face for engaging with fingers of the clutch to transfer axial force to disengage clutch plate from a flywheel;
a static ring in engagement with the rotating ring through a plurality of balls positioned between the rotating ring and the static ring for a frictionless rotation of the rotating ring relative to the static ring about a rotational axis of the bearing;
a spherical cup sized to accommodate the static ring within an inner cavity of the spherical cup;
wherein the spherical cup incorporates an inner spherical surface such that the static ring engages with the spherical cup through the spherical surface on the spherical cup;
wherein the inner spherical surface on the spherical cup has a radius whose center coincides with a center point defined by an intersection of the rotational axis of the bearing and a plane defined by the face of the rotating ring that engages with the fingers of the clutch; and
wherein engagement of the static ring with the spherical cup enables the static ring, along with the rotating ring and the plurality of balls positioned between the rotating ring and the static ring, to tilt about the center point to accommodate any angular misalignment between the fingers of the clutch and the rotating ring.

2. The self-aligning bearing of claim 1, wherein the static ring, in the region that is in engagement with the spherical surface on the spherical cup, incorporates a radius that is equal to or less than the radius of the spherical surface on the spherical cup.

3. The self-aligning bearing of claim 1, wherein the self-aligning bearing further comprises a spherical ring located within an inner diameter of the static ring; wherein the spherical ring incorporates a spherical end face on an outer diameter of the spherical ring, and the static ring incorporates a spherical end face on an inner diameter of the static ring; and wherein the spherical end face on the static ring and the spherical end face on the spherical ring have the same radius with the centers of the static ring and the spherical ring coinciding with the center point.

4. The self-aligning bearing of claim 3, wherein the spherical ring is preloaded against the spherical end face of the static ring by a spring.

5. The self-aligning bearing of claim 4, wherein the spring is positioned between a stopper on a sleeve on which the bearing is mounted, and the spherical ring.

6. The self-aligning bearing of claim 5, wherein the spherical end face on the static ring and the spherical end face on the spherical ring are configured such that engagement of the spherical ring with the static ring through the respective spherical end faces, coupled with the preloading of the spherical ring by the spring retains the bearing with the sleeve against axial displacement.

7. The self-aligning bearing of claim 5, wherein inner diameters of the spherical ring and the spherical cup are larger than outer diameter of the sleeve resulting in a clearance for the spherical ring and the spherical cup to shift radially inward, thereby allowing the bearing to self-center with reference to the clutch.

8. The self-aligning bearing of claim 1, wherein the spherical ring is heat treated.

\* \* \* \* \*